US012023682B2

(12) United States Patent
Biondillo et al.

(10) Patent No.: US 12,023,682 B2
(45) Date of Patent: Jul. 2, 2024

(54) CRUSHER

(71) Applicant: Wescone Distribution Pty Ltd., Bentley (AU)

(72) Inventors: Joe Biondillo, Belmont (AU); Ayrton Sue, Malaga (AU); Lee Bolton, Belmont (AU); Daniel Berti, Malaga (AU)

(73) Assignee: WESCONE DISTRIBUTION PTY LTD., Bentley (AU)

( * ) Notice: Subject to any disclaimer, the term of this patent is extended or adjusted under 35 U.S.C. 154(b) by 314 days.

(21) Appl. No.: 17/635,297

(22) PCT Filed: Aug. 10, 2020

(86) PCT No.: PCT/AU2020/050827
§ 371 (c)(1),
(2) Date: Feb. 14, 2022

(87) PCT Pub. No.: WO2021/026598
PCT Pub. Date: Feb. 18, 2021

(65) Prior Publication Data

US 2022/0288597 A1 Sep. 15, 2022

(30) Foreign Application Priority Data

Aug. 15, 2019 (AU) ................................ 2019902955

(51) Int. Cl.
*B02C 2/04* (2006.01)

(52) U.S. Cl.
CPC .............. *B02C 2/045* (2013.01); *B02C 2/047* (2013.01)

(58) Field of Classification Search
CPC ........... B02C 2/04; B02C 2/042; B02C 2/045; B02C 2/047
See application file for complete search history.

(56) References Cited

U.S. PATENT DOCUMENTS 2,467,938 A 4/1949 Kennedy
3,944,146 A 3/1976 Stockmann et al.
(Continued)

FOREIGN PATENT DOCUMENTS

AU 618545 B2 2/1989
CN 106179577 A 12/2016
(Continued)

OTHER PUBLICATIONS

International Search Report and Written Opinion for PCT/AU2020/050827 (dated Sep. 7, 2020).
(Continued)

*Primary Examiner* — Bobby Yeonjin Kim
(74) *Attorney, Agent, or Firm* — Merchant & Gould P.C.

(57) ABSTRACT

A gyratory crushing apparatus for frangible or friable material comprises: a bowl having a chamber for receiving the material and a discharge opening disposed at the base with a central axis and a gyratory axis extending at an angle to the central axis; a crushing head and a drive assembly. The discharge opening defines a throat with a circumferential wall and the crushing head is disposed within the discharge opening. The crushing head has a crushing face in spaced relation to the circumferential wall of the throat defining a nip between the circumferential wall and the crushing face. The drive assembly includes a transmission and a rotatable eccentric shaft for driving the crushing head within the bowl and about the gyratory axis in a notating motion. The bowl also comprises a feed section and a discharge section, each defined by a wall and spaced by a mid-section, wherein thickness of a wall defining the mid-section is greater than a thickness of the discharge section wall.

18 Claims, 18 Drawing Sheets

(56) References Cited

U.S. PATENT DOCUMENTS

| | | | | | |
|---|---|---|---|---|---|
| 4,232,833 | A | * | 11/1980 | Werginz | B02C 2/047 241/207 |
| 2011/0084156 | A1 | | 4/2011 | Martinez, Jr. et al. | |

FOREIGN PATENT DOCUMENTS

| | | | | | |
|---|---|---|---|---|---|
| GB | 2309656 | B | | 8/1997 | |
| JP | S56-17944 | U | | 2/1981 | |
| WO | 87/004371 | A1 | | 7/1987 | |
| WO | 96/004993 | A1 | | 2/1996 | |
| WO | WO-9604993 | A1 | * | 2/1996 | B02C 2/047 |
| WO | WO-9604994 | A1 | * | 2/1996 | B02C 2/04 |
| WO | 2001/028689 | A1 | | 4/2001 | |
| WO | WO-0128689 | A1 | * | 4/2001 | B02C 2/047 |

OTHER PUBLICATIONS

International Preliminary Report on Patentability for PCT/AU2020/050827 (dated Sep. 20, 2021).

* cited by examiner

CRUSHER

This application is a National Stage Application of PCT/AU2020/050827, filed Aug. 10, 2020, which claims priority to Australian Patent Application No. 2019902955, filed Aug. 15, 2019, and which applications are incorporated herein by reference. To the extent appropriate, a claim of priority is made to each of the above disclosed applications.

FIELD OF THE INVENTION

This invention relates to crushing apparatus for frangible or friable material.

BACKGROUND ART

Australian Patent No. 618545 relates to a suspended shaft gyratory crusher comprising a bowl having a chamber for receiving material to be crushed with the bowl having a central discharge opening at its base. A crushing head, with a gyratory axis, is disposed generally centrally within the discharge opening having a crushing space spaced from the wall of a throat to define an annular nip. The crushing head is driven by a drive assembly to permit rotational and oscillatory motion of the crushing head about a pivot point to crush material to a finer particle size.

Crushers of gyratory type have until recently proved successful, for example, in iron ore mining operations. However, market conditions in extractive industries such as iron ore are dynamic and customer demand for ores of various types can change. Iron ore, for example, is available in fine and lump ore sizes. As indicated by the terminology, these iron ore types vary in both particle size and, sometimes, iron oxide content.

As customers have sought lump ore, of a greater particle size, the previously described gyratory crusher has met operational challenges with failures becoming more frequent and material throughput falling. Indeed, the challenges have risen to the point that customer preference for the previously described crusher is falling and focus on possible substitutes has increased with concern that the gyratory crusher, for example as described in Australian Patent No. 618545 amongst others is fundamentally unsuitable for the application. This discussion is not intended to indicate limitation of potential problems to the iron ore sector, the problems would also occur for other ore types, for example in the base metal sector. Analogous problems could also be expected in other mineral resource sectors.

Solution to the excessive crusher failure problem must engage with various issues. For example, whatever the ore size, the crusher must have a limited footprint/packaging volume to integrate with existing structural engineering constraints, particularly where used for sampling purposes and must also integrate with other related equipment to allow in-situ sampling performance (i.e. whilst the bulk material is being conveyed) to occur. As capital cost is always a significant constraint in resource operations, it is an inadequate solution to propose an alternative in which a material requires secondary/further crushing, than currently available, before being directed to a gyratory crusher for use in sampling; or an alternative crusher design solution that has a mass increase and that requires substantial support infrastructure.

SUMMARY OF THE INVENTION

It is an object of the present invention to address the maintenance problems with existing gyratory crushers as encountered by customers caused by inadequate crusher performance specifications and capability, especially when seeking to handle larger dimensional ore sizes.

With this object in view, the present invention provides a crushing apparatus for frangible or friable material comprising:

a bowl having a chamber for receiving said material and a discharge opening disposed at the base thereof, said discharge opening defining a throat having a circumferential wall and the bowl having a central axis;

a crushing head disposed within said discharge opening having a crushing face in spaced relation to said circumferential wall of said throat defining a nip between said circumferential wall and the crushing face of said crushing head, said crushing head having a gyratory axis extending at an angle to the central axis; and a drive assembly including a transmission and a rotatable eccentric shaft for driving said crushing head within said bowl and about said gyratory axis in a nutating motion wherein said bowl comprises feed and discharge sections, each defined by a wall and spaced by a mid-section of said bowl also defined by a wall, wherein thickness of said wall defining at least the mid-section of said bowl is greater than thickness of the wall of the discharge section.

The wall of the feed section of the bowl may have approximately the same thickness as the wall of the discharge section of the bowl. Outer and inner surfaces of each of the respective feed wall and discharge wall, are conveniently both circular (resulting in cylindrical feed and discharge sections) and, conveniently, concentric. A convenient bowl cavity configuration comprises two intersecting frusto-conical portions, defined by the mid-section wall, the first frusto-conical portion forming the upper portion of the bowl and tapering in a downward direction, desirably at an angle of between 30 and 35 degrees from the central axis. The second frusto-conical portion, forming the lower portion of the bowl, tapers in a downward direction. The thickest section of the walls of the bowl, being the wall of the mid-section, conveniently aligns with a plane at which the first and second frusto-conical portions intersect, desirably about the mid depth of the bowl. In such case, the bowl cavity cross sectional area is least on this plane. The plane also conveniently extends along the transverse central axis of the bowl. The outer surface of the bowl is desirably generally smooth and not provided with a webbed configuration to avoid compromising bending strength. The wall of the mid-section preferably comprises solid material with a wedge shaped or triangular section with an apex of this section located about the middle of the depth of the bowl. The wedge section preferably has a scalene or obtuse triangle shape, with one side corresponding with an inner wall of the upper portion of the bowl and another side corresponding with an inner wall of the lower portion of the bowl, this latter side having lesser length. The increased bending strength is associated with an increase in crushing efficiency.

In a preferred embodiment, the crusher head includes a head liner or mantle—of wear resistant material—and, advantageously, the head liner comprises two parallel vertically extending side walls (conveniently of a cylindrical portion of the head liner and so providing the head liner with a substantially cylindrical shape) joined at the top by a crown portion. The parallel vertically extending side walls of the head liner may also be formed integral with a lower frusto-conical crushing face. The parallel geometry assists in reducing or avoiding problems of material ejection from the crusher bowl, a problem associated with reduced crushing efficiency. The wall of the crown portion preferably has greatest thickness of the above defined portions of the head liner; in particular, in the portion where the crown portion transitions to the parallel side walls of the head liner. This wall thickness may taper downward along the parallel side walls and crushing face of the head liner or mantle as a consequence of reduced stress profile in these portions compared to the crown portion. The crown portion may promote some fragmentation of material fed to the crusher.

Conveniently, part of an adjusting means for adjusting height of the bowl may be located in the mid-section wall in a manner not achieved with the prior art crusher. A convenient adjusting means includes a plurality of boss holes spaced around the perimeter of the mid-section and located within spaced apertures arranged circumferentially about, and partly through, the mid-section. Bolts co-operate with a clamp or like means that can be worked to rotate the bowl and adjust its height, desirably in co-operation with the threaded portion of the bowl as described below.

The crusher conveniently includes a housing, known as a base spider, for supporting the crusher and accommodating the drive assembly and a lubrication system. The bowl, which is conveniently a replaceable component which may be supplied separately, is connected to the base spider by suitable means which may include a combination of fasteners, such as bolts, sufficient to maintain a secure connection during operation of the crusher. Conveniently, an outer wall of the discharge section of the bowl may be threaded enabling a threaded connection to be made with a threaded aperture of the spider. Such threaded connection may have a plurality of threads selected to allow height adjustment for the bowl in combination with use of the bolts of the adjusting means described above. The spider may be connected to a frame or other surface through a flange or plate.

The crusher conveniently includes a discrete feed portion through which material is preferably gravity fed to the bowl. The feed portion could form part of the bowl but a separate feed chute is conveniently disposed above the bowl and connected to the bowl by suitable fastening means. The feed portion, whether provided as a chute or not, conveniently includes an elevated vertical section with walls preferably slightly angled to the longitudinal central axis to direct feed material in desired direction towards the crusher nip. Advantageously, the head liner or mantle is confined within the bowl and feed chute with the crown portion extending a short distance into the feed chute. This feature assists in reducing or avoiding the problem of material, especially lump, ejection.

The drive assembly prime mover may include an electric motor or engine for providing power to the rotatable eccentric shaft through a drive assembly or powertrain including a transmission system conveniently located at a base of the crusher. The rotatable eccentric shaft is connected to an output shaft of the transmission system, the input shaft of the transmission system being rotated by a suitable drive such as a belt drive linking an output shaft of the prime mover and the input shaft of the transmission system through a pulley or gear arrangement. Rotation of the head liner is prevented, conveniently by bearing arrangement(s) between the eccentric shaft and head liner, from causing rotation of the head liner. Rather, the crusher head liner is caused to move in a gyratory or nutating motion about the gyratory axis without the head liner itself rotating about the eccentric shaft.

Components of the crusher are conveniently available, in further embodiments of the invention, as separate replaceable components. So, for example, the feed chute and bowl—as described above—may both be replaced as part of routine or breakdown maintenance.

Where a feed chute is provided as a separate replaceable component, The feed chute—as described above—conveniently includes an elevated vertical section with walls preferably slightly angled to the longitudinal central axis, as above described, to direct choke feed material in desired direction towards the crusher nip and improve material charge area.

Other components of the crusher are likewise replaceable during maintenance which is preferably provided on a regular, scheduled basis to minimise risk of failure during service.

The crusher, as above described, can crush feed of a higher particle size (e.g +60%) than previous gyratory crushers supplied by the Applicant with minimised risk of failure and a higher degree of availability and utilisation while minimising power requirements for a given crushing pressure; these advantages being achieved within the same overall packaging size as compared to previous gyratory crushers. In this regard, the preferred substantially cylindrical geometry of the head liner with its parallel vertical sides—together with the extension of the crown portion a short distance into the feed chute—has the consequence that the head liner is confined within the bowl cavity and the feed chute effectively lowering the crush zone and essentially avoiding lump ejection and the inefficient crushing that results from that. At the same time, the crusher can be accommodated within the same ground or floor space as available for earlier crushers, making retrofit a straightforward task.

DESCRIPTION OF PREFERRED EMBODIMENTS

The crushing apparatus of the invention will be better understood in view of the following description of a preferred embodiment thereof made with reference to the accompanying drawings in which:

FIG. 1*a* is a schematic side section elevation of a prior art gyratory crusher.

FIG. 1*b* is an orthogonal view of the gyratory crusher of FIG. 1*a*.

Figure 4:
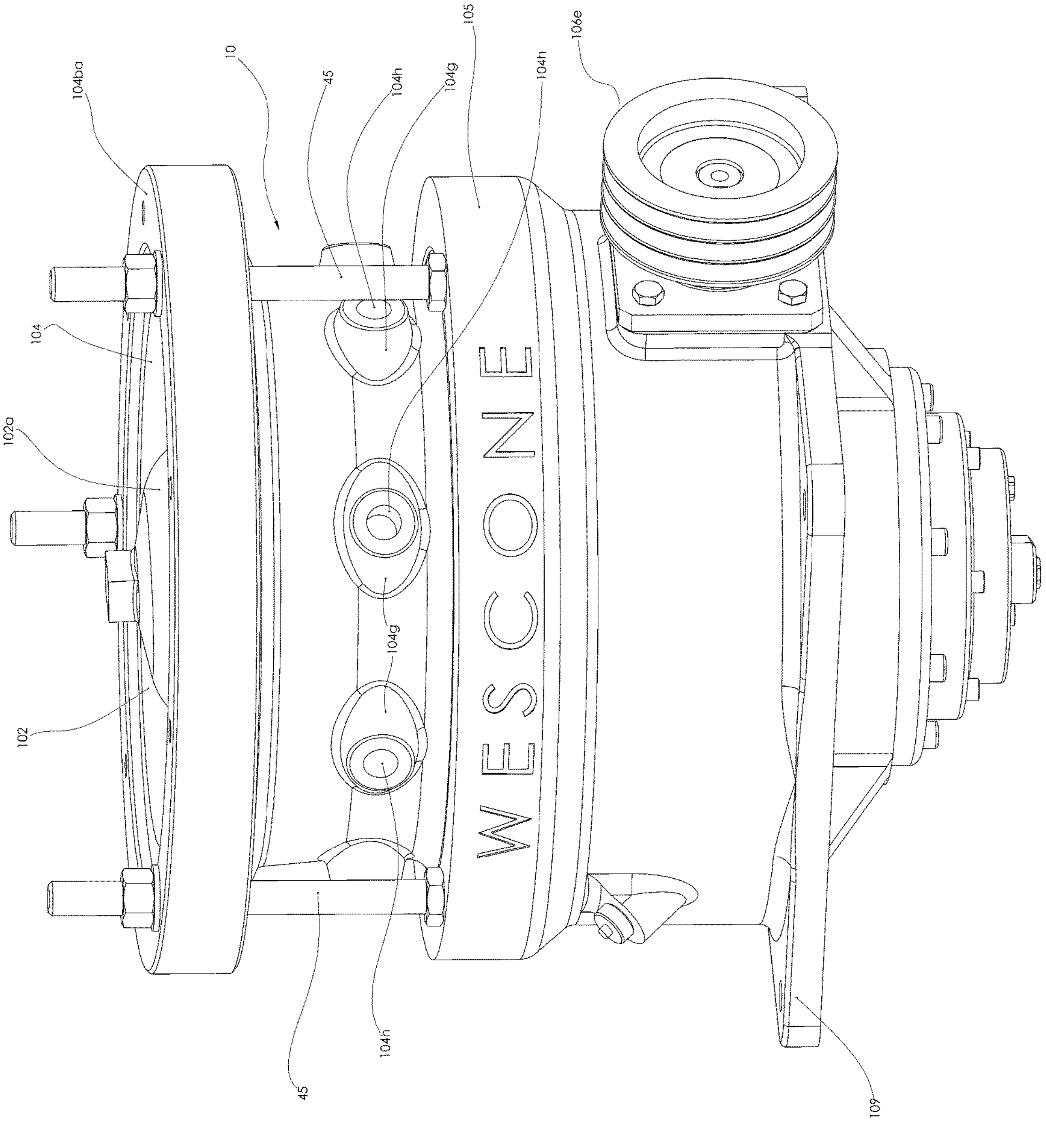
FIG. 4 is a partial orthogonal view of a crusher being a further embodiment of the crusher of the present invention.
Figure 4A:
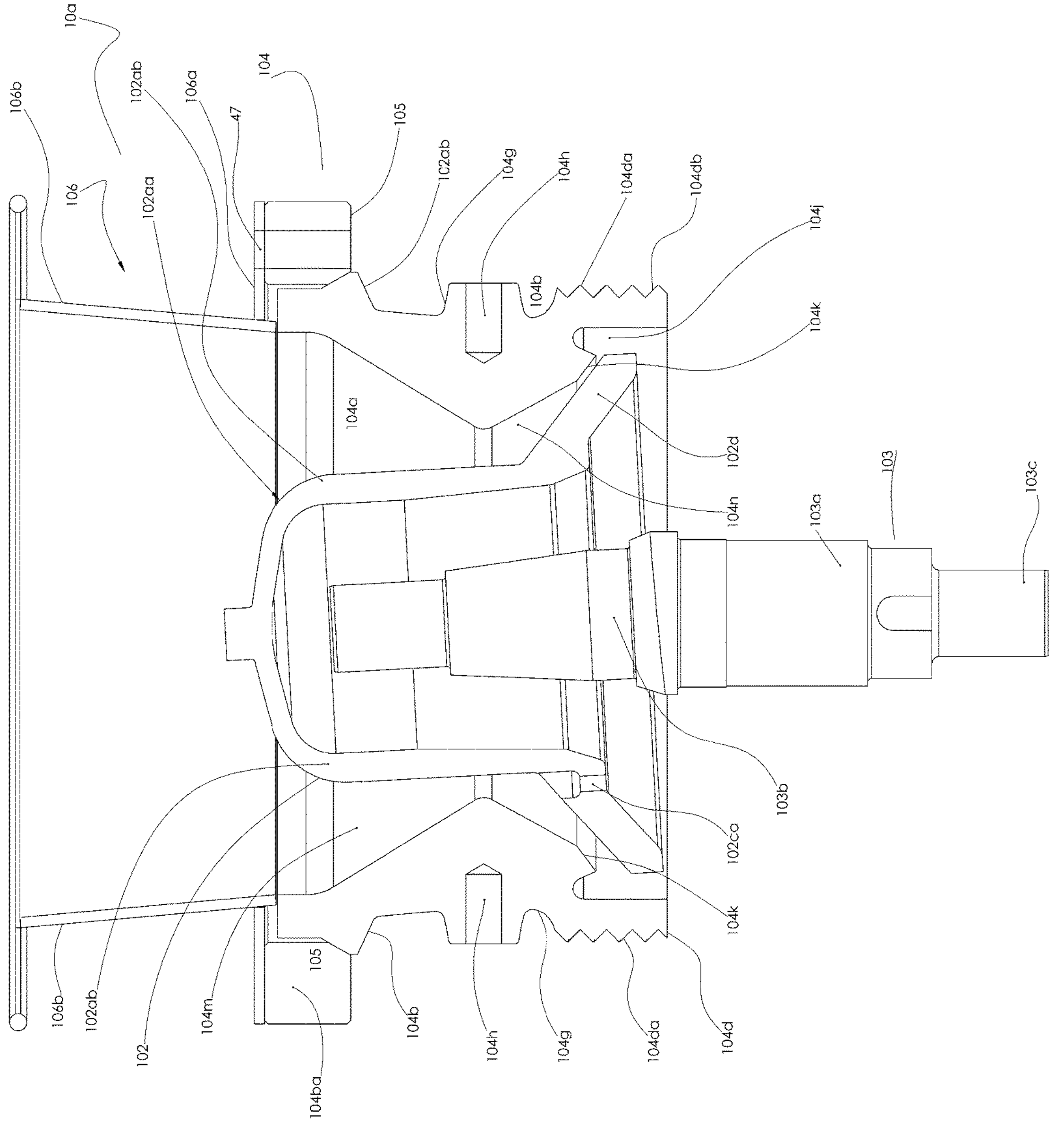

FIG. 4*a* is a schematic side section of an upper portion of the crusher showing bowl, feed chute, crushing head and rotating shaft in operative condition.

Figure 5:
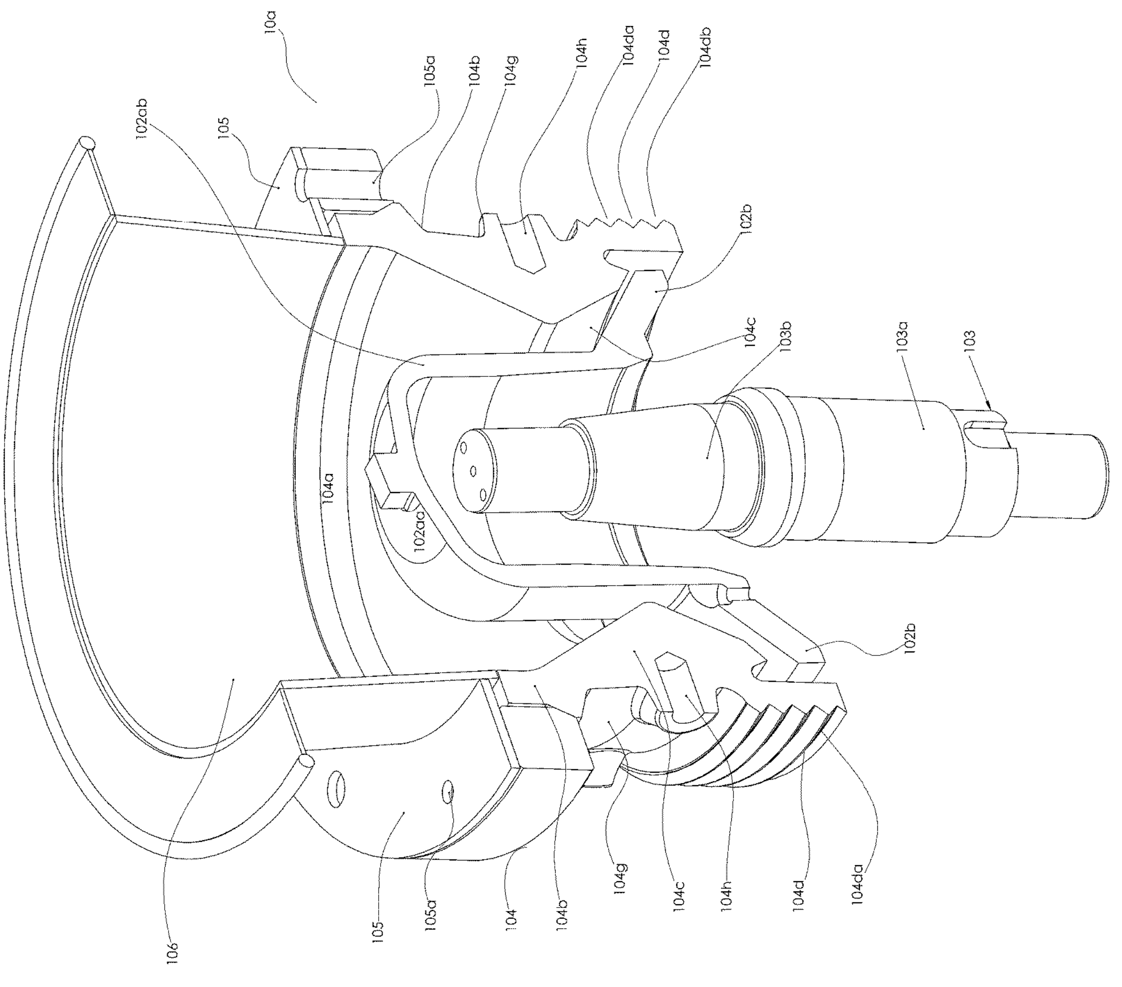

FIG. 5 is an orthogonal schematic side section of an upper portion of the crusher showing bowl, feed chute, crushing head and rotating shaft in operative condition.

Figure 6:
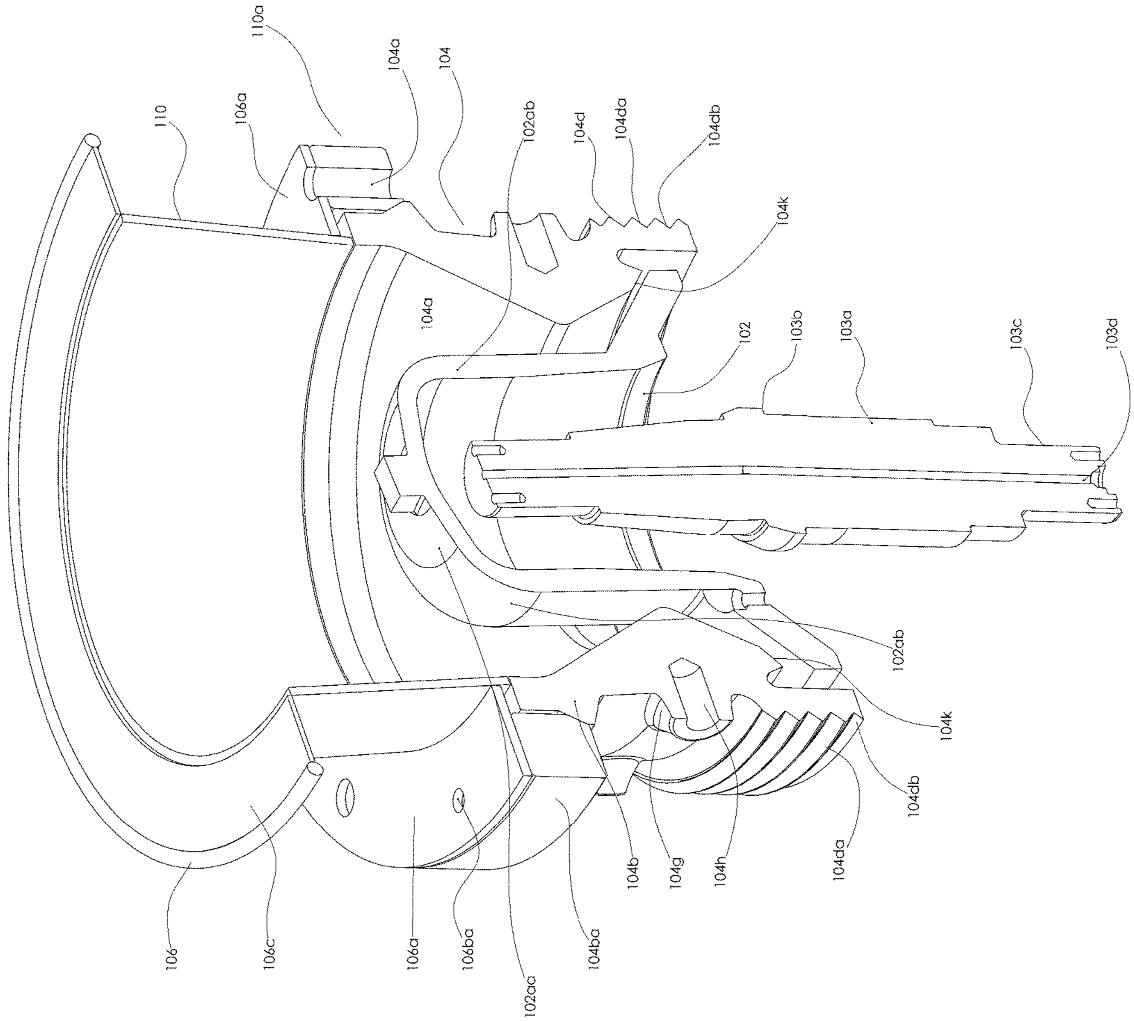

FIG. 6 is an orthogonal schematic side section of an upper portion of the crusher similar to FIG. 5 and showing the rotating shaft in section.

Figure 7:
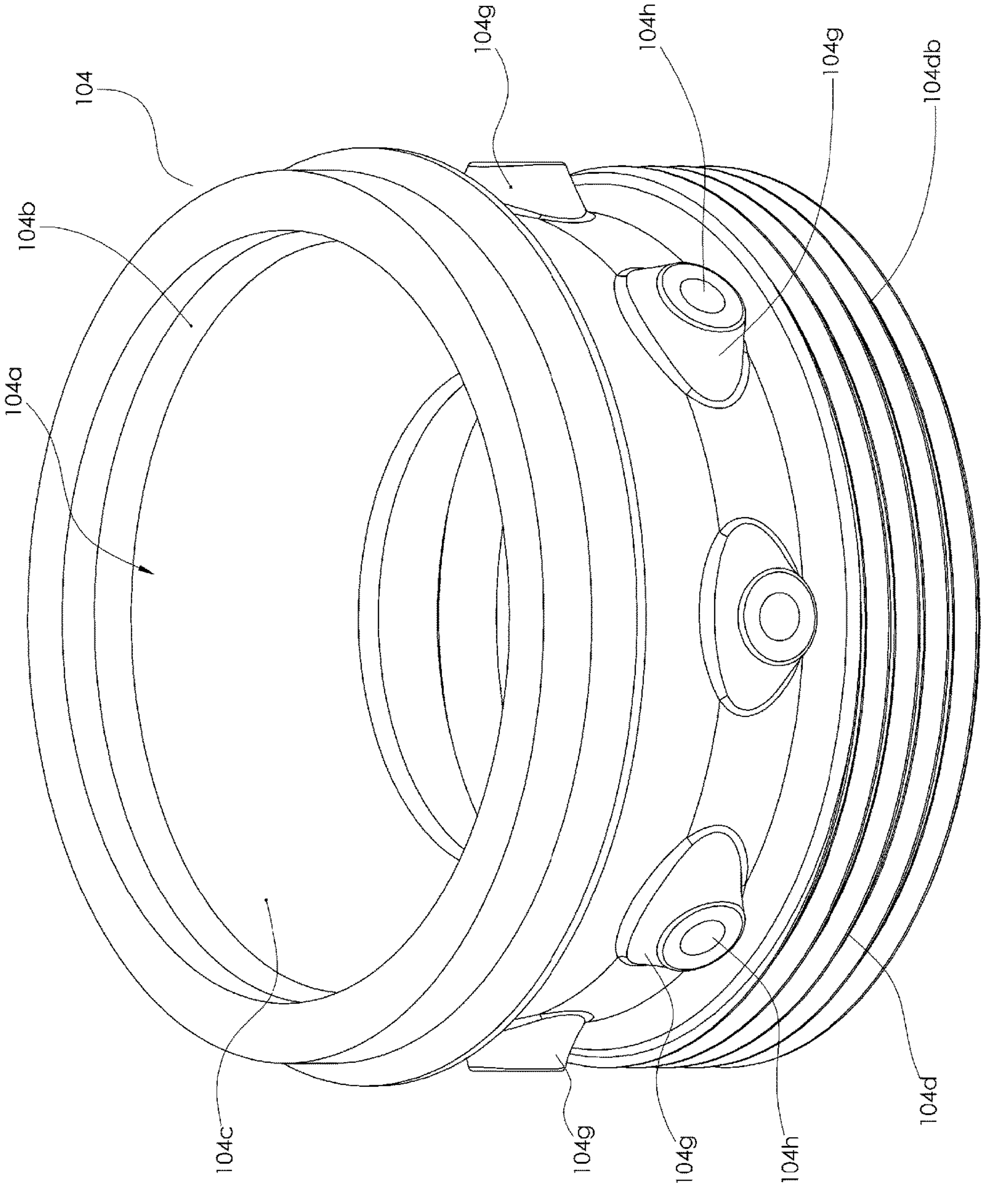

FIG. 7 is a top view of the bowl shown in FIGS. 4 to 6.

Figure 8:
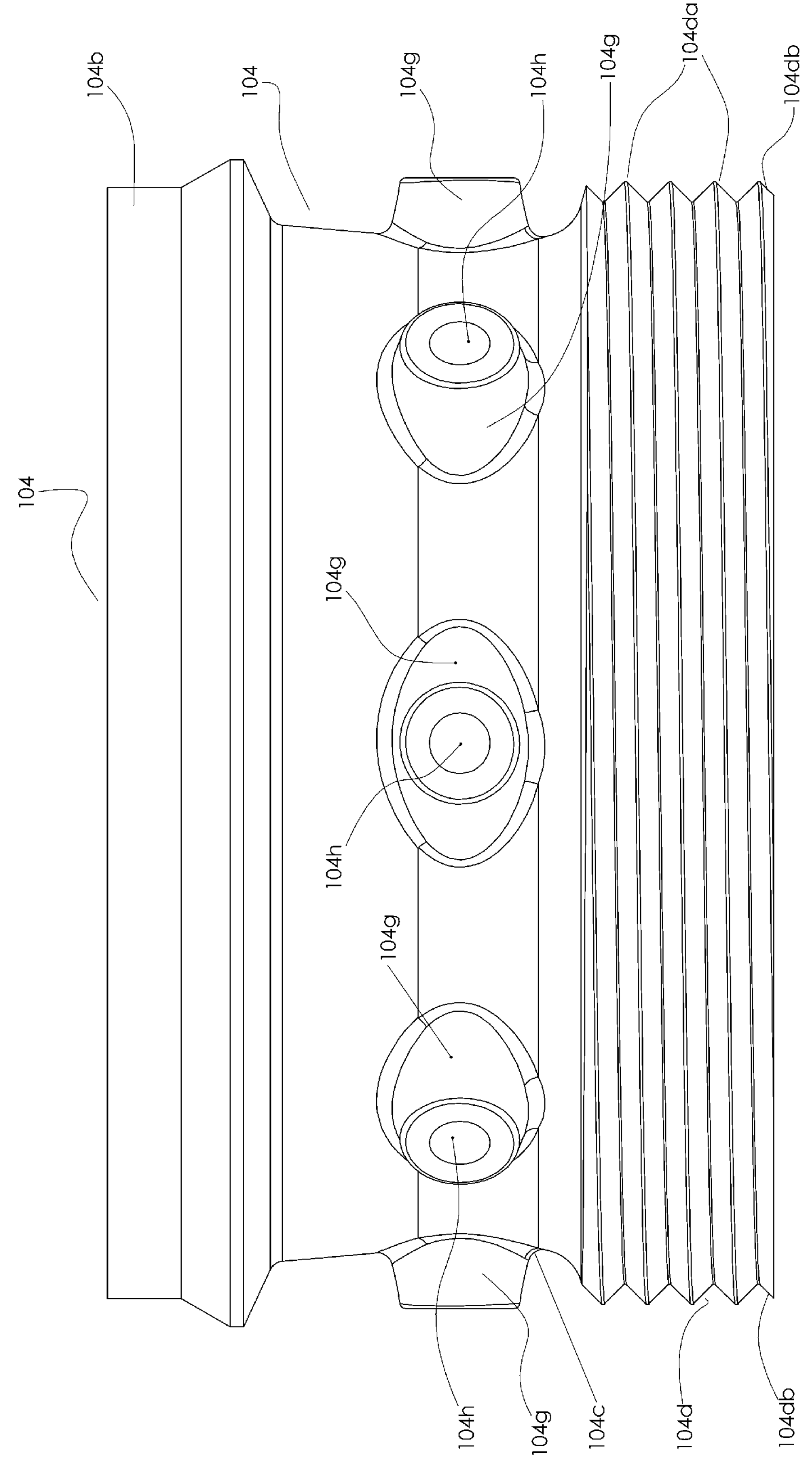

FIG. 8 is a side view of the bowl shown in FIGS. 4 to 7.

Figure 9:
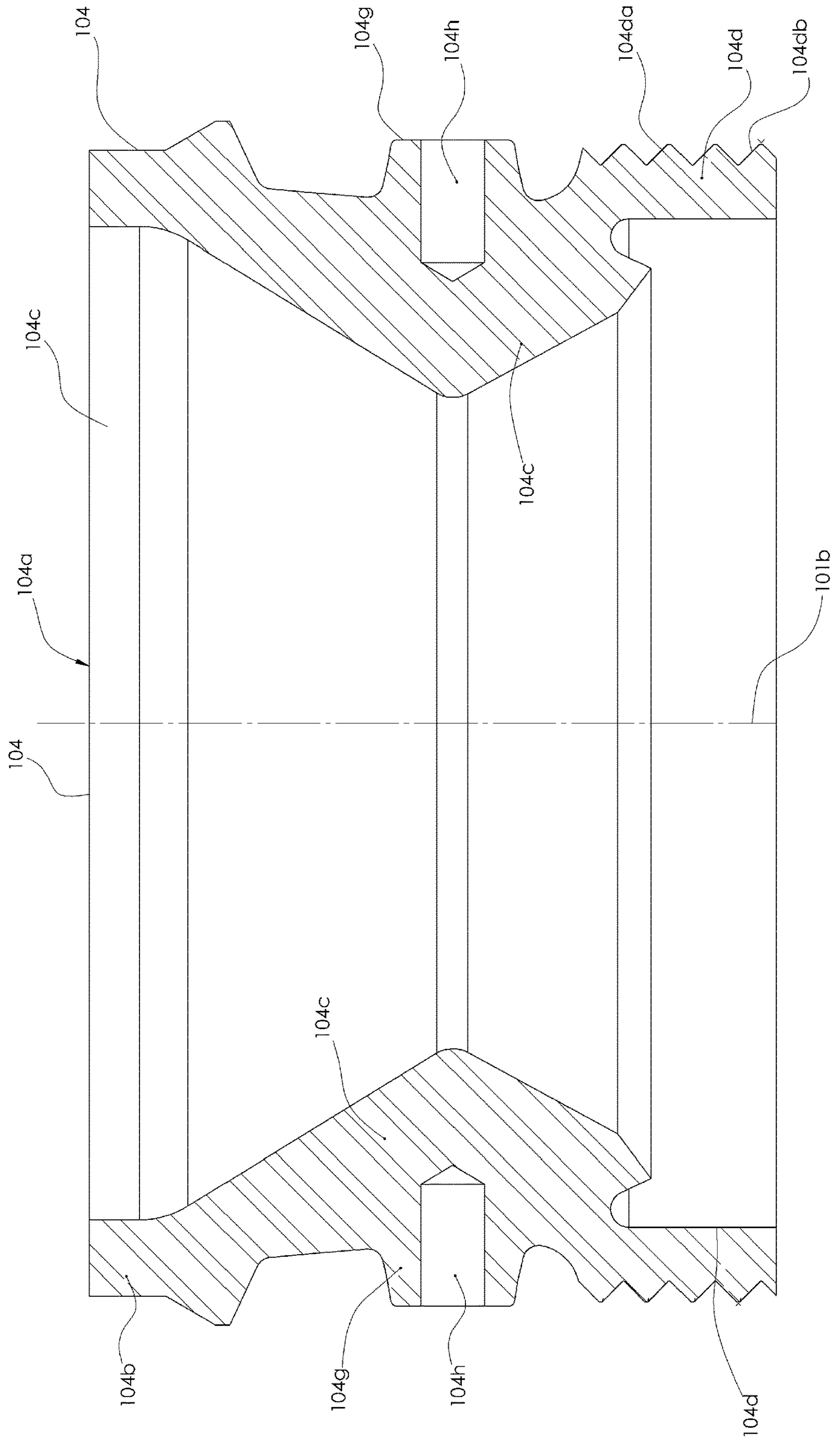

FIG. 9 is a side section view of the bowl shown in FIGS. 4 to 8.

Figure 10:
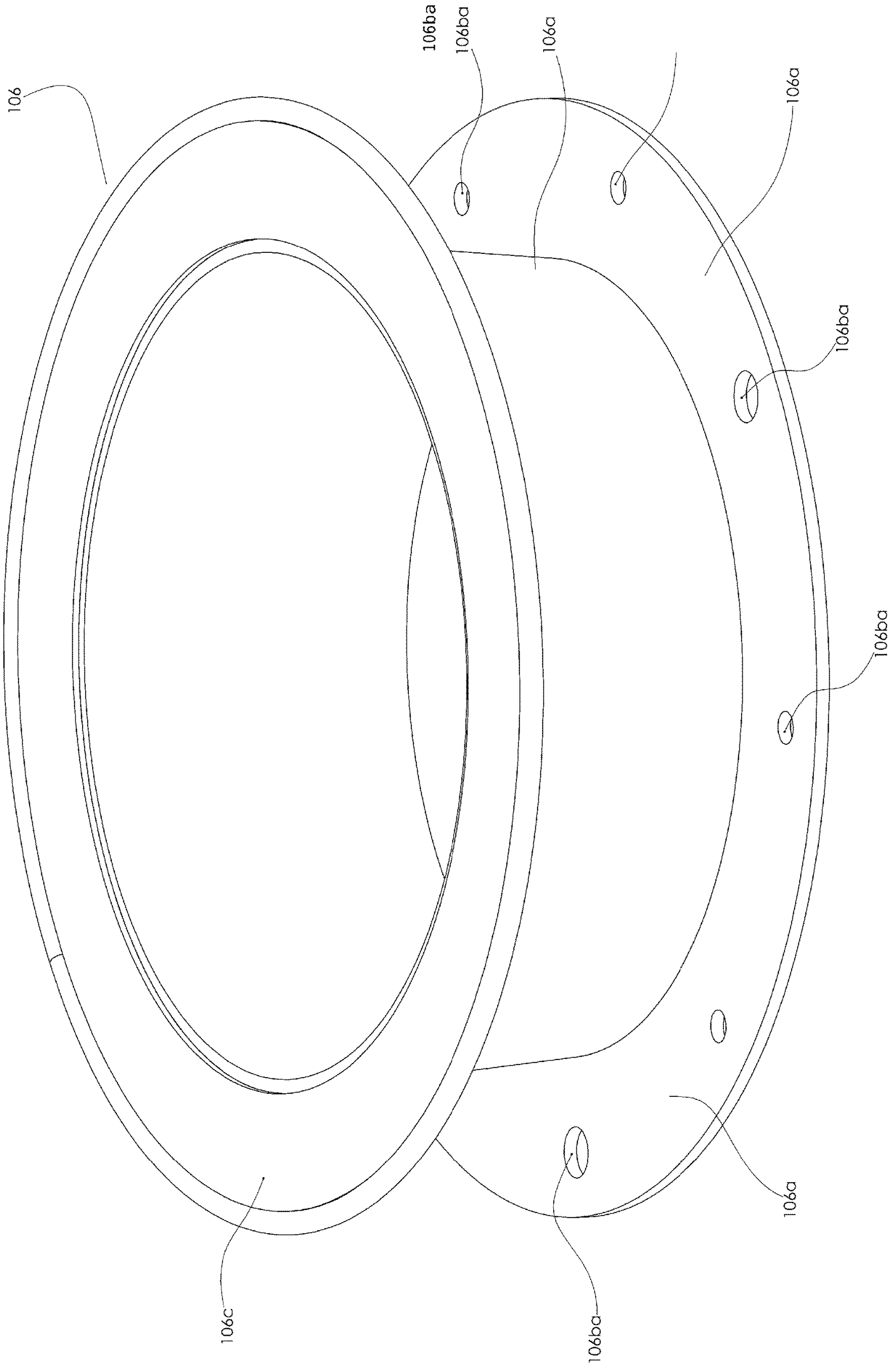

FIG. 10 is an orthogonal view of the feed chute shown in FIGS. 4*a* to 6.

Figure 11:
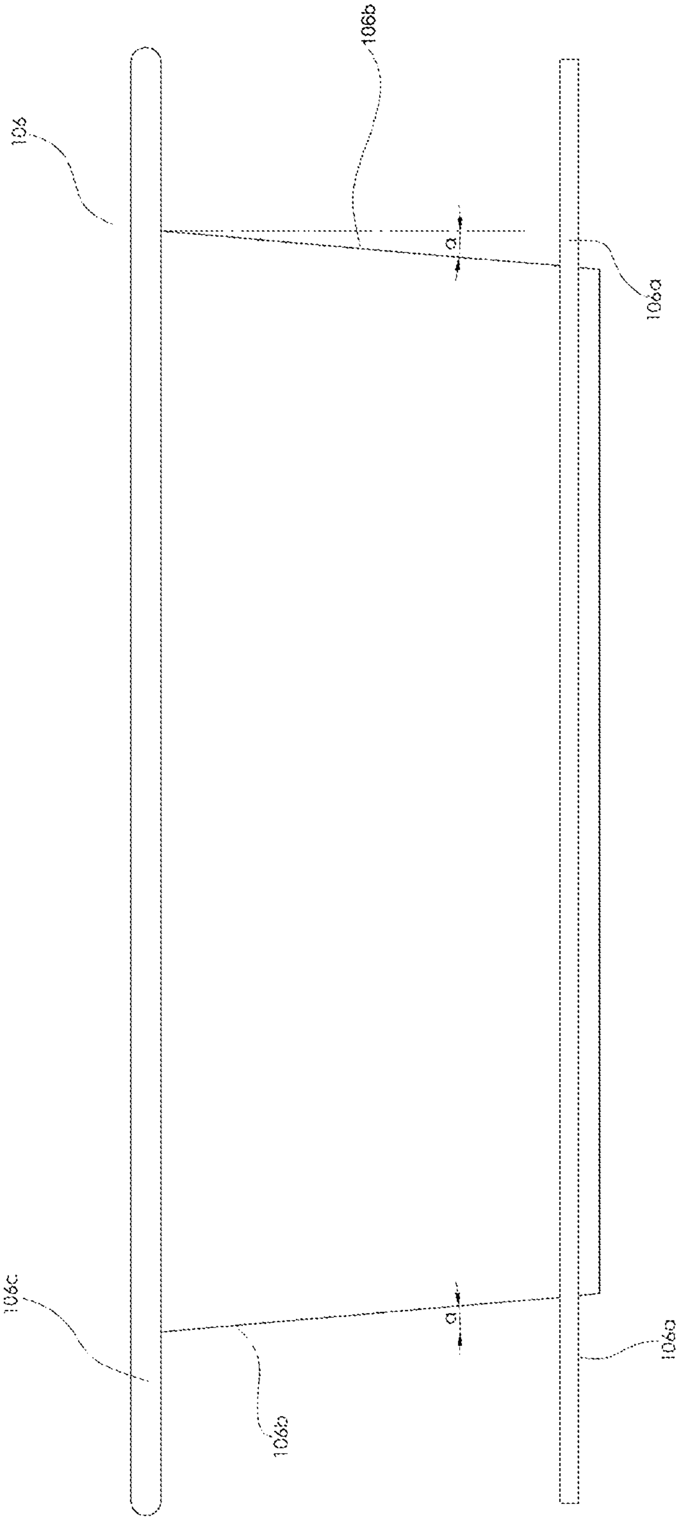

FIG. 11 is a side section view of the feed chute shown in FIGS. 4*a* to 6 and 10.

Figure 12:
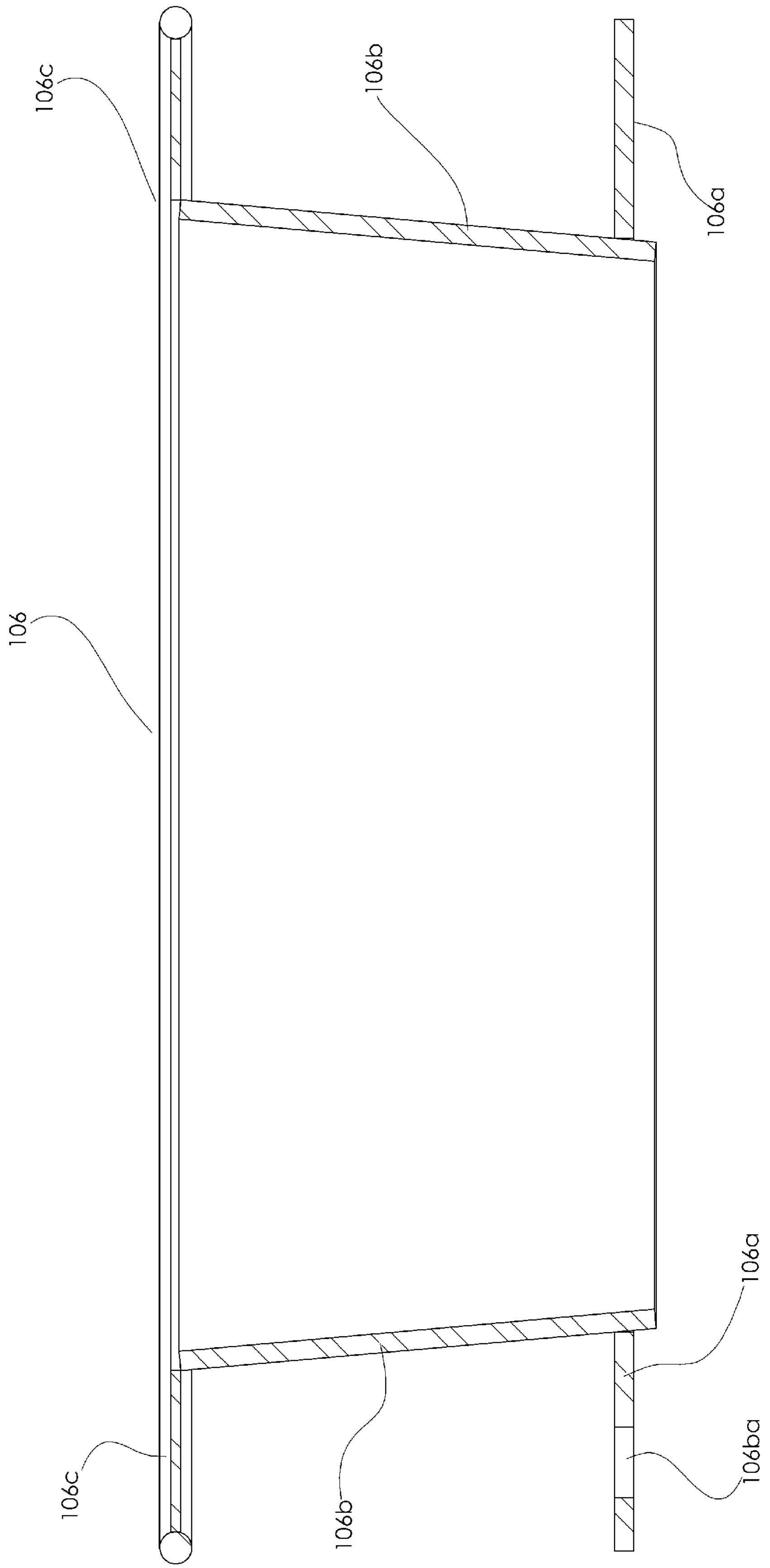

FIG. 12 is a side section view of the feed chute shown in FIGS. 4*a* to 6, 10 and 11.

Figure 13:
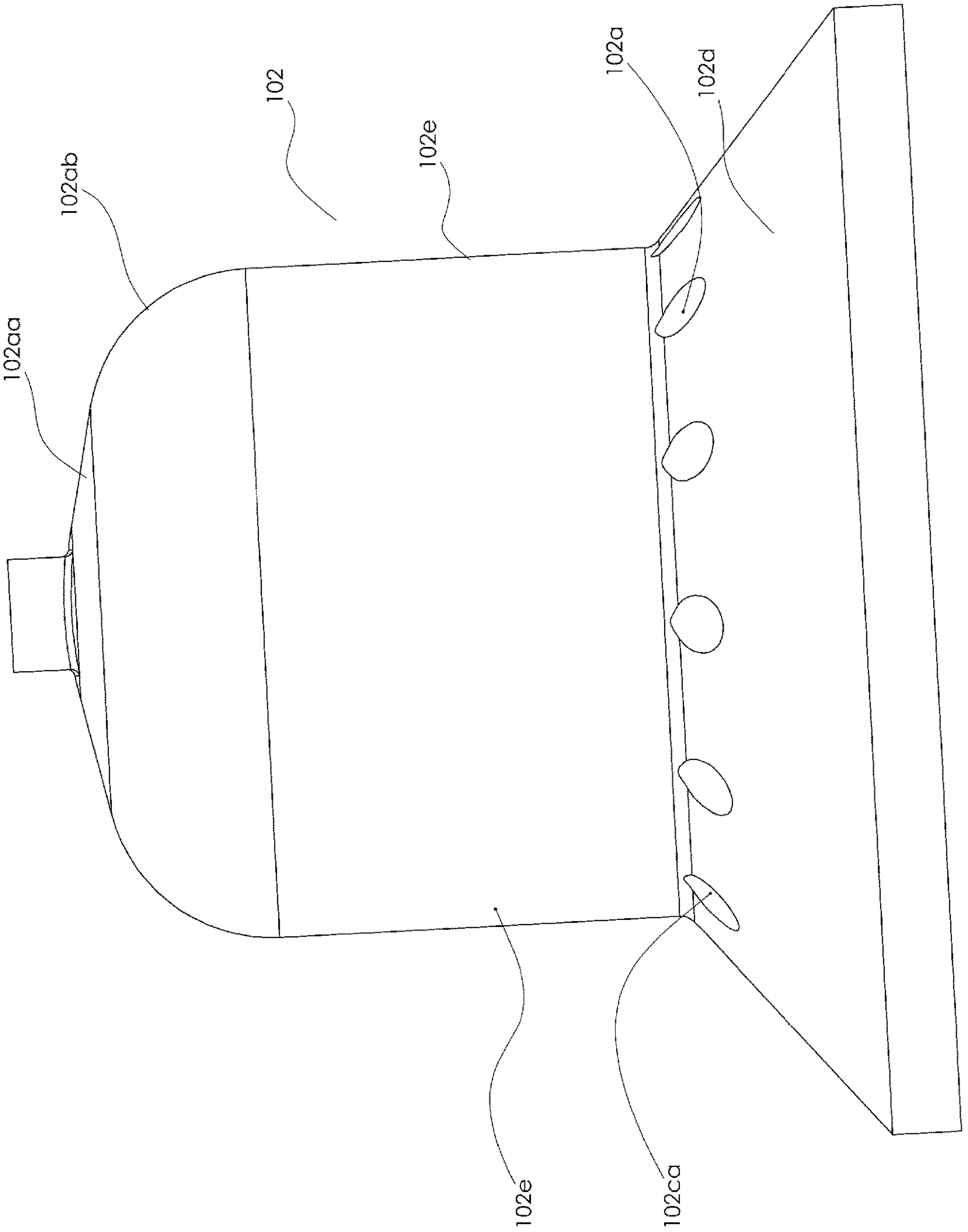

FIG. 13 is a side view of the crushing head shown in FIGS. 4 to 6.

Figure 14:
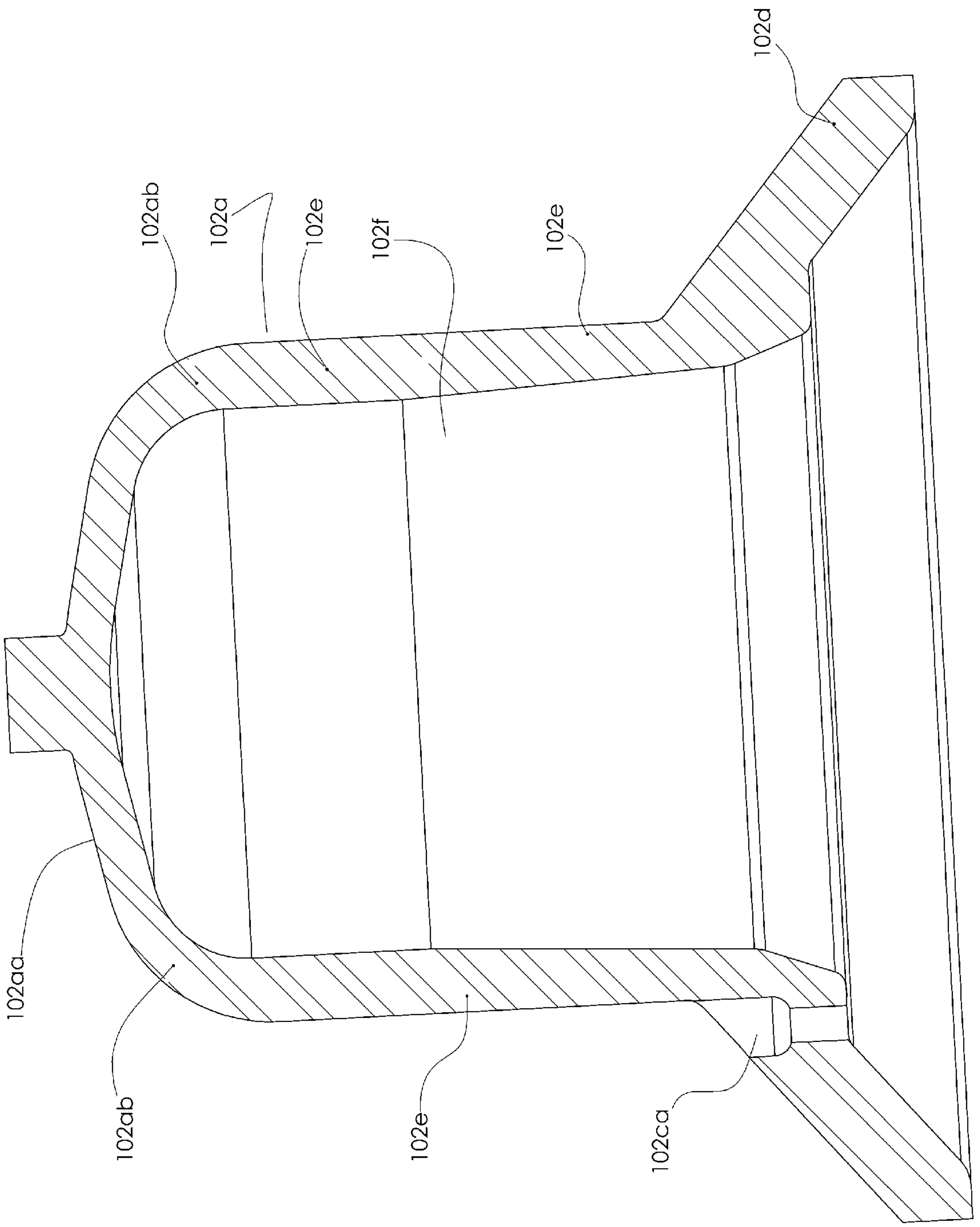

FIG. 14 is a side section view of the crushing head shown in FIGS. 4 to 6 and 13.

Figure 15:
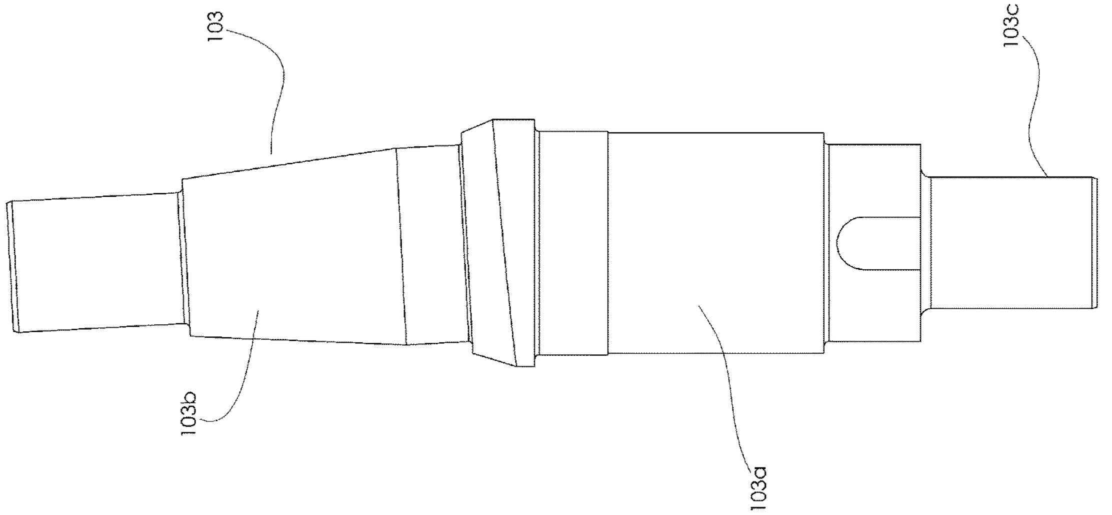

FIG. 15 is a side view of the rotating shaft of the crusher as shown in FIGS. 4*a* to 6.

Figure 16:
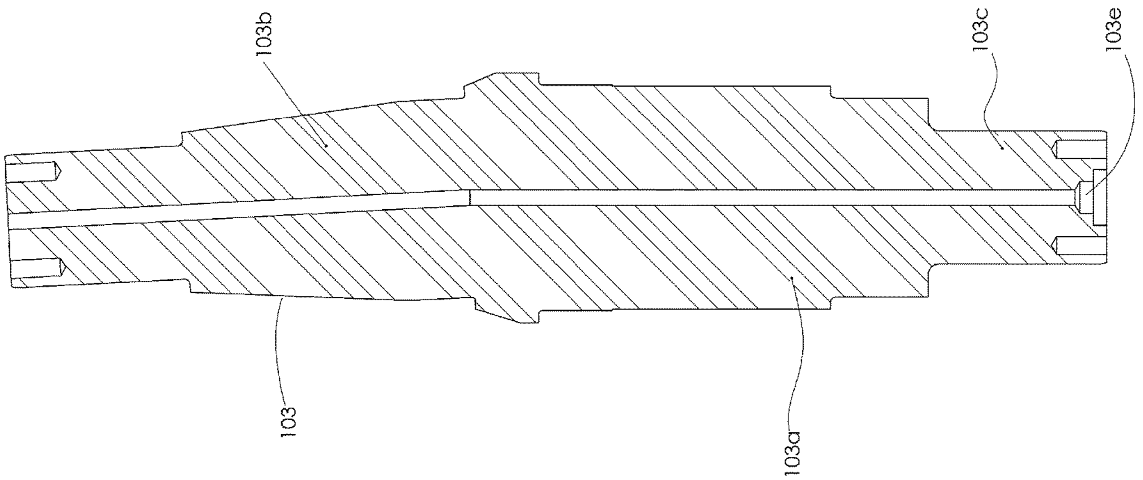

FIG. 16 is a side section view of the rotating shaft of the crusher as shown in FIGS. 4*a* to 6 and 15.

Figure 1A:
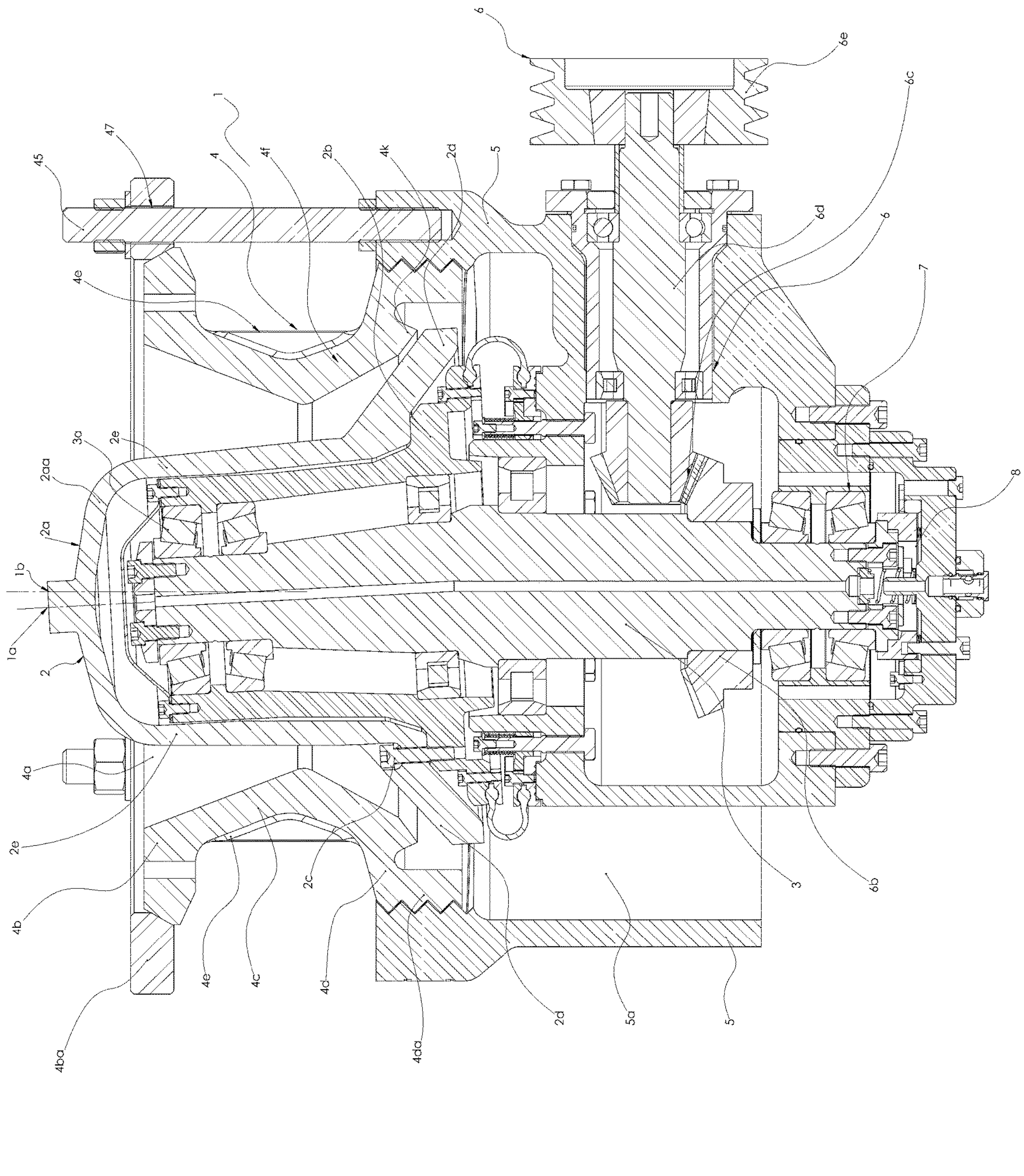

Referring to FIGS. 1*a* and 1 *b*, there is shown a prior art gyratory crusher 1 for crushing iron ore samples having a crushing head 2 connected to a rotatable eccentric shaft 3 by a roller bearing assembly 3*a* disposed within the cavity of a bowl 4. Eccentric shaft 3 extends in the direction of a gyratory axis 1*a* disposed at an angle from a centre axis 1*a* of the crusher 1 which also corresponds with a centre axis (or axis of symmetry) of bowl 4.

Crushing head 2, which is symmetrical about gyratory axis 1*a*, comprises a bell or frusto-conically shaped wear resistant head liner or mantle 2*a* bolted to a hub or bearing housing 2*b* by circumferentially spaced bolts 2*c*. Head liner 2*a*, having a lower frusto-conical crushing face 2*d* of relatively substantial dimension relative to the dimensions of head liner and a smaller crown portion 2*aa* joining side portions 2*e* from each other which diverge at a small angle, is bolted to a rotating hub 2*b* by circumferentially spaced bolts 2*c*. Crown portion 2*aa* has a near constant thickness.

Figure 1B:
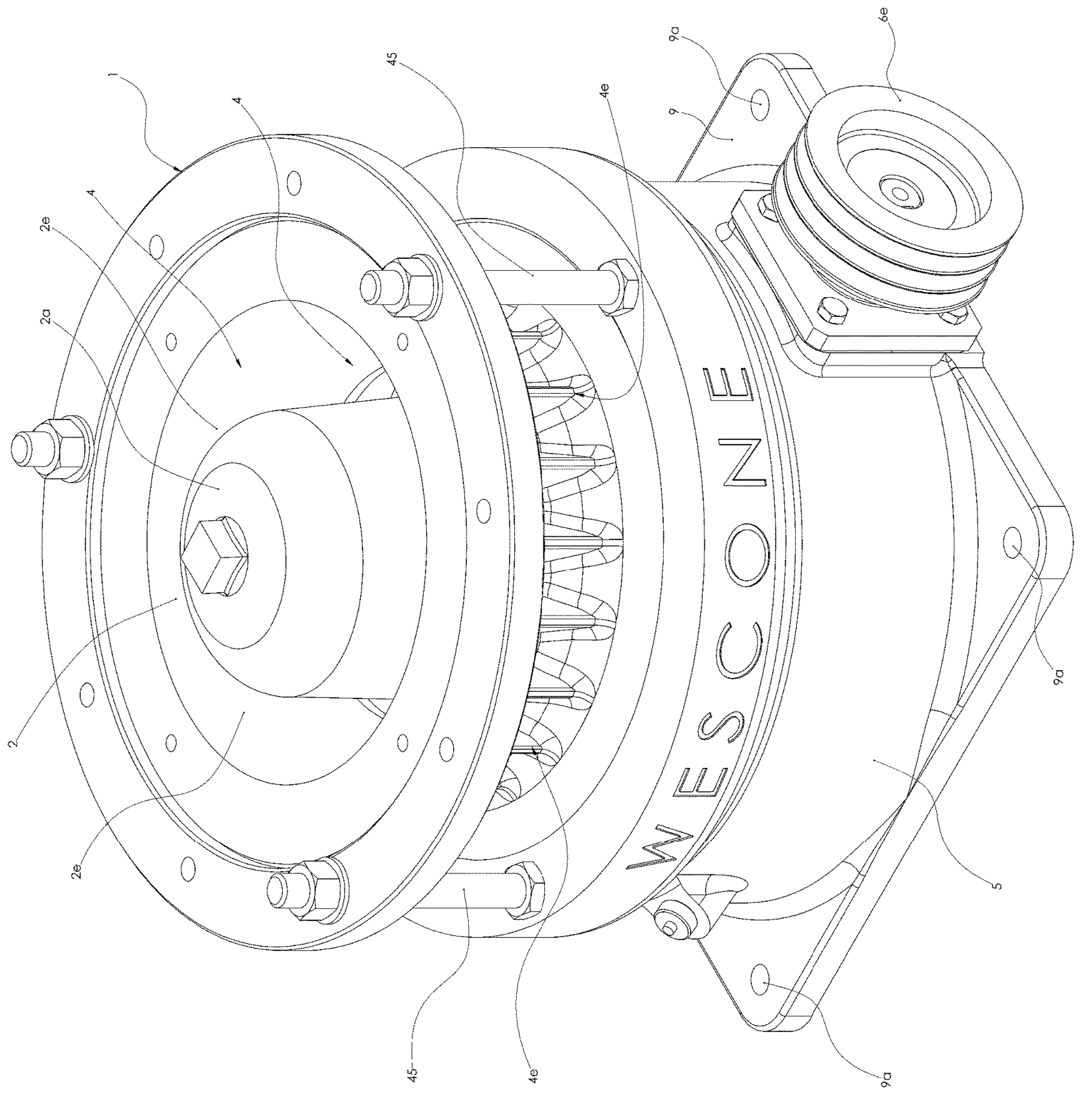

Bowl cavity 4*a* has a feed section 4*b* including an upper flange 4*ba* and a discharge section 4*d* separated by a mid-section 4*c* which includes circumferential wall 4*k*. As apparent from FIG. 1, the wall thickness throughout the sections 4*b-d* of bowl 4 is approximately constant. The bowl has a webbed outer wall and webs 4*e*, which are spaced about the perimeter of bowl 4, are shown in FIG. 1*b*.

Bowl 4 has a threaded section 4*da* of the discharge section 4*d* connected with a housing, known as a base spider, 5 by circumferentially arranged bolts 35 extending through bolt holes 47 and into bolt holes of the spider 5. This ensures a secure connection during crushing. Spider 5 supports bowl 4 and accommodates a drive assembly 6 for transmitting power from a prime mover, such as an engine through a transmission 6*a* to rotate the eccentric shaft 3. Spider 5 has, as shown in FIG. 1*a*, a base flange 9 connected by bolts, inserted through bolt holes 9*a* located at the corners of the base flange 9, to an iron ore processing plant floor/frame.

As to operation of crusher 1, the eccentric shaft 3 is connected to a crown gear 6*b* driven by an output gear 6*c* connected to the output shaft 6*d* of the transmission 6. Output shaft 6*d* is connected to a pulley 6*e* driven by a belt (not shown). The bottom end of eccentric shaft 3 is journalled in a bottom bearing arrangement 7 connected with a lubricant system including an oil pump 8. When crown gear or eccentric 6*b* rotates, the eccentric shaft 3 rotates and, through connection of the eccentric shaft 3 to the bearing housing or hub 2*b* of crusher head 2 and head liner 2*a* through suitable bearing arrangements as known in the art, the crushing head 2 to which it is connected is caused to gyrate or nutate within bowl cavity 4*a*. The gyration causes the head liner 2*a* to progressively approach, and recede from, circumferential wall 4*k* on a cyclical basis, each cycle representing an oscillation of crusher head 2. As the head liner 2*a* approaches the circumferential wall 4*k*, material of higher dimension than the nip size between the two is progressively crushed, through both action of the crusher head 2 and autogenous action between particles of material, and directed downward into discharge chamber 5*a* of spider 5.

Crusher 1 performs well for smaller iron ore sizes, with size below about 40-50 mm. However, failure has occurred frequently and at unacceptably short intervals as iron ore sizes increase beyond the 40-50 mm level. As a result, users of crusher 1 have been forced to look for other sample crusher options. Failure occurs predominantly in the crown 2*aa* of head liner 2*a* along the horizontal plane at the top of bowl 4 with bogging of the crusher 1 also being a potential issue at higher lump ore particle sizes. Another problem, correlated with the divergent sides 2*e* of head liner 2*a*, is ejection of lumps from crusher 1 which reduces efficiency whilst still causing wear on the head liner 2*a*.

Figure 2:
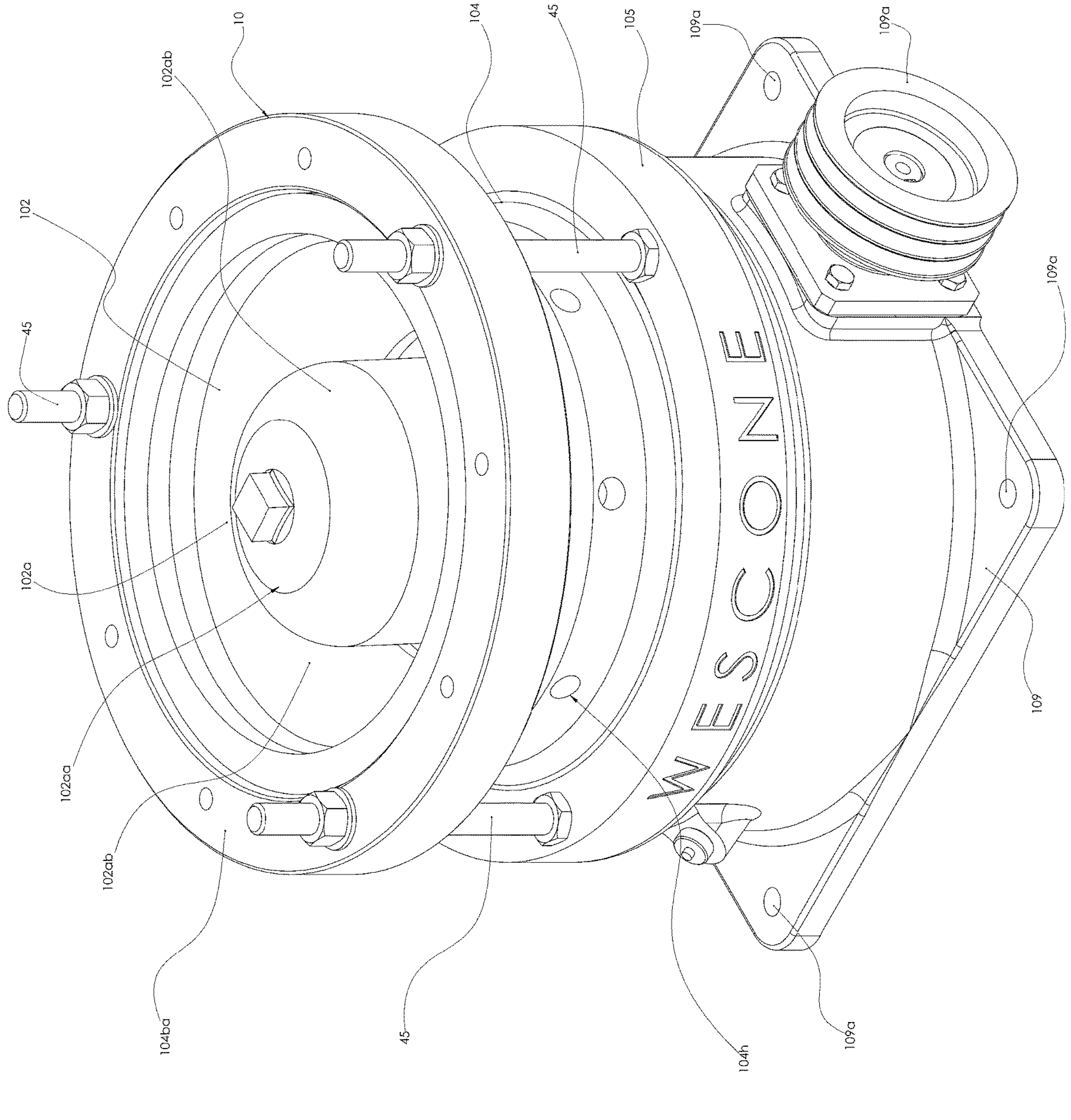
FIG. 2 is an orthogonal view of a gyratory crusher according to one embodiment of the present invention.
Figure 3:
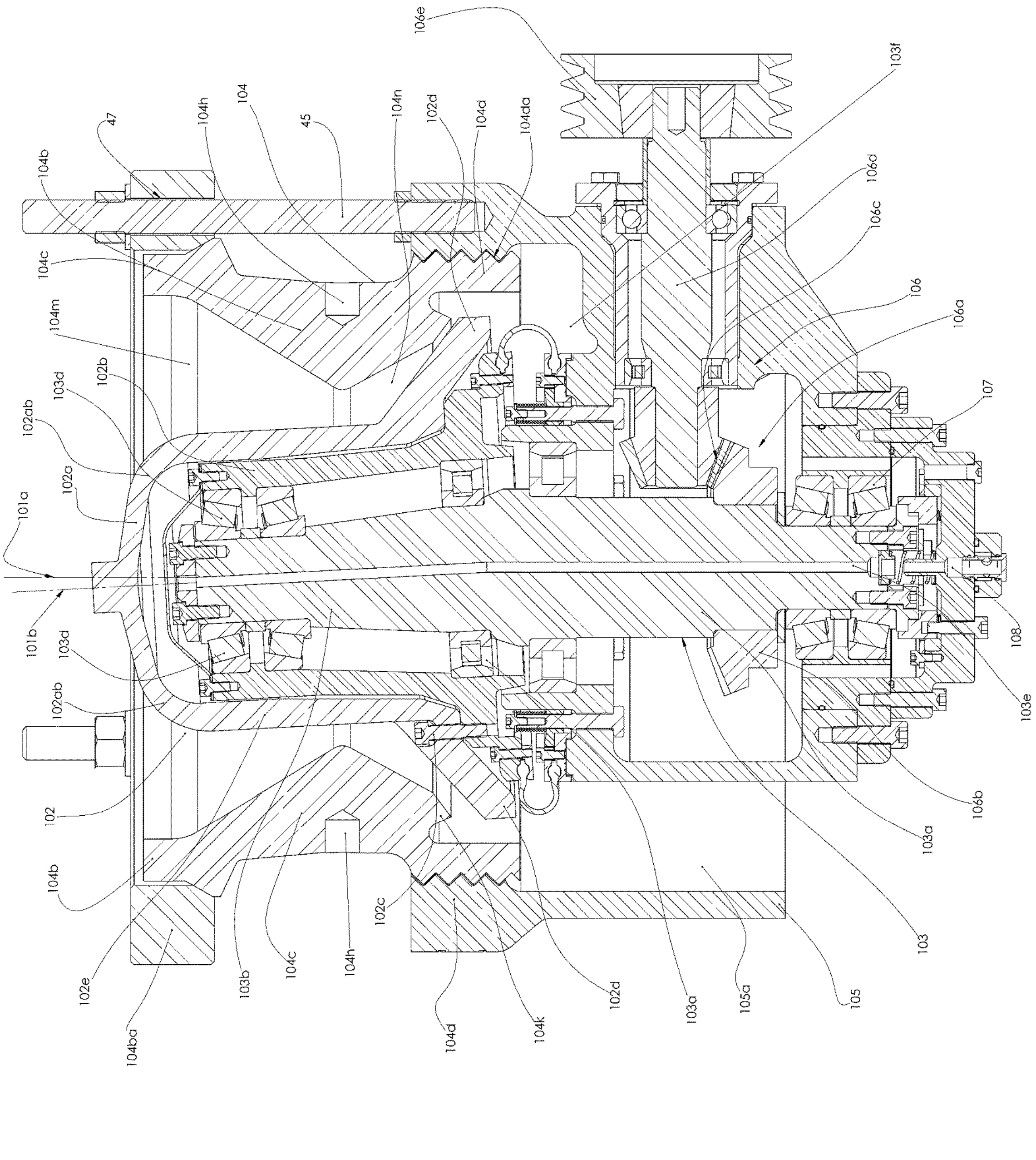
FIG. 3 is a detailed side section of the gyratory crusher of FIG. 2.

Referring to FIGS. 2 and 3, there is shown a crusher 10 again for crushing lump iron ore (though crusher 10 may be applied to other crushing of ores and other friable materials). Crusher 10 may be used for sample crushing applications though this is not intended to be limiting on potential applications as it will be understood that gyratory crushers can have high throughput and can be used in production applications.

Crusher 10 has an upper portion 10A comprising a bowl 104 having a chamber 104*a* for receiving a lump iron ore feed and a discharge opening 104*j* disposed at its base. Discharge opening 104*j* defines a throat having a circumferential wall 104*k*. Bowl 104 may be provided as shown in FIGS. 2 and 3 with a substantially smooth cylindrical outer surface at its mid-section wall 104*c* or, as shown in FIGS. 4 to 9, with circumferentially arranged dimples 104*g* with boss holes 104*h* useful to engage with a tool for adjusting the height of the bowl 104 relative to the base spider 105, and nip dimension, as described below.

Bowl 104 comprises feed and discharge walls 104*b* and 104*d*, spaced by a mid-section wall 104*c*, wherein thickness of the mid-section wall 104*c* is greater than thickness of the feed and discharge walls 104*b* and 104*d* respectively. Surprisingly, the thickness of the wall of the feed and mid-sections—and corresponding bending strength—needs to be greater than in the discharge section of the bowl 104 despite significant cyclic impacts during crushing. The wall of the mid-section 104*c* is a solid wedge or triangular shaped section, more specifically having the shape of a scalene triangle.

Referring further to the configuration of the bowl cavity 104*a*, this comprises two intersecting frusto-conical portions, each defined by mid-section wall 104*c*, the first portion forming a feed chamber 104*m* of the bowl 104*a* and tapering, from a greater dimension and at a greater acute angle (32 degrees cf. 21 degrees to the central axis) than for bowl cavity 4*a* of crusher 1, in a downward direction. The second portion, forming a crushing chamber 104*n* of the bowl, tapers in a downward direction. The thickest section of the wall of the bowl 104*a* aligns with a plane A, along a transverse central axis of the bowl 104*a*, at which the first and second portions, or the feed and crushing chambers 104*m*, 104*n*, intersect. Bowl cavity 104*a* cross sectional area is least on this plane.

The feed wall 104*b* of the bowl 104 has approximately the same thickness as a lower portion 104*da* of the discharge section 104*d* of the bowl 104. The outer surfaces of the wall at both the feed section 104*a* and at lower discharge portion 104*da* are substantially cylindrical and symmetric or co-centric about central axis 101*a*. The outside of the bowl 104 is smooth and not, unlike crusher 1 shown in FIGS. 1 and 2, provided with a webbed configuration to avoid compromising bending strength. Despite the greater bending strength, failure will still occur after a certain number of crushing oscillations or cycles. To this end, bowl 104 is a replaceable component which may be supplied separately for installation as part of a repair or preventative maintenance programme.

A crushing head 102, as shown in FIGS. 2 to 6, is disposed within the discharge opening 104*j* of bowl cavity 104*a*. A gyratory axis 101*a* extends along the eccentric shaft 103 at an angle (about 2 degrees) to the central axis 101*b*. As with crushing head 2, crushing head 102, which is symmetrical about gyratory axis 1*a*, comprises a wear resistant head liner or mantle 102*a* bolted to a hub 102*b* by circumferentially spaced bolts 102*c* inserted through bolt holes 102*ca* as shown in FIGS. 13 and 14.

Head liner 102*a* has a lower frusto-conical crushing face 102*d* integrally formed with a cylindrical portion 102*e* having a crown 102*aa*, these portions of the head liner 102*a* defining a hollow bore 102*f* for accommodating crusher head bearing housing 102. The wall of the crown 102*aa* is thickest (e.g. 5-6 mm) at the portions 102*ab* where crown 102*aa* transitions to cylindrical portion 102*e*, this thickness tapering down towards the bottom of the head liner 102*a* as a consequence of reduced stress profile in cylindrical portion 102*e* and crushing face 102*d* compared to the crown portion 102*aa*. The crown portion 102*aa* therefore has a structure that assists fragmentation of material. It will be seen that, unlike the divergent walls 2*e* of head liner 2*a*, the vertically extending side walls of cylindrical portion 102*e* are substantially parallel along their length providing a substantially cylindrical shape for the head liner 102*a*. This results in a slight but, as will be described below important increase, in the working volume of bowl cavity 104*a* and crusher 10.

Crushing face 102*d* is disposed in spaced relation to circumferential wall 104*k* to define an annular nip of cyclically variant dimension typical of gyratory crushers. The arrangement is such that iron ore, or other frangible or friable material, fed into the bowl cavity 104*a* is subjected to crushing by the motion of the crushing head 102 relative to circumferential wall 104*k*, with opposite sides of the crushing head 102 co-operating with a lower face of the circumferential wall 104*k* of the throat to maintain the gap of the nip during an entire oscillation of the crushing head 102.

Rotatable eccentric shaft 103 is journalled within a roller bearing assembly 103*d*, disposed within the bore of crusher head bearing housing 102*b* as shown in FIG. 3. Eccentric shaft 103, shown in detail in FIGS. 3 to 6, 15 and 16, comprises three integrally formed portions of 4140 steel with tensile strength of about 925 MPa: mid portion 103*a*, upper portion 103*b* and lower portion 103*c*. This has substantially higher (e.g 46%) tensile stress than the eccentric shaft 3 of crusher 1. The mid-portion 103*a* is cylindrical and has greatest diameter of the three portions. Upper portion 103*a* comprises a frusto-conical section and a cylindrical section, both extending away at an angle from a longitudinal central axis of the eccentric shaft (which aligns with the longitudinal central axis 101*a* of crusher 10) along the gyratory axis 101*b*. The drawings exaggerate this angle, which is about 2 degrees. Both upper portion 103*b* and lower portion 103*c* have cylindrical portions which are journalled into respective roller bearing assemblies 103*d* and 107. These require lubrication by oil pumped from oil pump 108, including through oil duct 103*e* extending through eccentric shaft 103. Roller bearing assemblies 103*d*, together with the seal 103*f* allow the eccentric shaft 103 to rotate without causing rotation of the crusher head 102. Rather, the crusher head 102 including head liner 102*a* is caused to nutate or gyrate about the gyratory axis 101*a* during operation of crusher 10 with progressive crushing resulting.

Bowl discharge section 104*d* has a threaded section 104*da* threadably connected with a complementary threaded bore of a housing, known as a base spider, 105. Connection also involves circumferentially arranged bolts 45 extending through bolt holes 47 of a flange 104*ba* engaged with the bowl 104 and into bolt holes of the spider 105. This ensures a secure connection during crushing. Base spider 105 supports bowl 104 and accommodates a drive assembly 106 of a powertrain for transmitting power from a prime mover, such as an engine through a transmission 106*a* to rotate the eccentric shaft 103, the bottom end of which, as with the top end, is journalled in a bottom roller bearing arrangement 107. Spider 105 also accommodates the oil pump of a lubrication system 108 which is connected to roller bearing arrangement 107.

Base spider 105 has, as shown in FIGS. 2 and 4, a base flange 109 connected by bolts (not shown), inserted through bolt holes 109*a* (as shown in FIG. 2) located at the corners of the base flange 109, to an iron ore processing plant frame/floor. It will be observed that the area of base flange 109 is the same as base flange 9 for crusher 1. This illustrates both a design constraint and an advantage of crusher 10 in that, in replacing crusher 1 with benefits as described above and further below, no further floor space is required and retrofitting is straightforward.

The crusher 10 desirably includes, as shown in FIGS. 4*a* to 6, a feed chute 106 connected to the bowl 104 and base spider 105, through which material is gravity fed to the bowl 104, preferably as a choke feed as understood in the crushing art. Feed chute 106, as shown in detail in FIGS. 10 to 12, includes respective upper and lower flanges 106*a* and 106*c* formed integral an to elevated vertical section with walls 106*b* slightly angled to the vertical, at angle α, to direct feed material in desired direction towards the crusher nip and to improve iron ore charge area or the charge area for other crusher feed materials. Flange 106*a* has bolt holes 106*ba* which enable the same bolts 45, as used to connect the bowl 104 with the base spider 105, to secure the feed chute 106 to the bowl 104 and—indirectly— the base spider 105. It will be seen that head liner 102*a* is confined within the bowl 104 and feed chute 106 with the crown 102*aa* extending a short distance into the feed chute 106. The result is a lowered crushing zone in comparison to the crushing zone of crusher 1.

As to constructional details of the powertrain and operation of crusher 10, the eccentric shaft 103 is connected to a powertrain including a crown gear 106*b* driven by an output gear 106*c* connected to the output shaft 106*d* of the transmission 106. Output shaft 106*d* is connected to a pulley 106*e* driven by a belt drive (not shown). When crown gear or eccentric 106*b* rotates, the eccentric shaft 103 and the crusher head 102 to which it is connected by bearing arrangements as used in crusher 1 is caused to nutate or gyrate within bowl cavity 104*a*. The gyration causes the head liner 102*a* to progressively approach, and recede from, a lower face of circumferential wall 104*k* on a cyclical basis, each cycle representing an oscillation of crusher head 102. As the crushing face 102*d* of head liner or mantle 102*a* approaches the circumferential wall 104*k*, material of higher dimension than the nip size between the two is crushed and directed downward into discharge chamber 105*a* of base spider 105.

The nip of crusher 10 can be adjusted by inserting bolts of a tool such as a G clamp or like means (not shown) into, say a pair, of boss holes 104*h* of dimples 104*g*. Torque is then applied to rotate the bowl 104 using the threaded connection as described. Adjustment of the height of bowl 104 adjusts the nip dimension.

The crusher 10, as above described, can crush feed of a higher particle size (+60%) than previous gyratory crushers supplied by the Applicant with minimised risk of failure and higher efficiency, for example 9% or higher. At the same time, the crusher 10 can be accommodated within the same space as available for earlier crushers, making retrofitting a straightforward task. Operating performance of crusher 10 in comparison to crusher 1 is tabulated below for an iron ore having 80% passing 25 mm:

| | |
|---|---|
| 17% | 25-60 mm |
| 2% | 60-70 mm |
| 1% greater than | 70 mm |

for two months of operation as respectively shown in Tables 1 and 2:

TABLE 1

| | Crusher 1 | Crusher 10 | Units |
|---|---|---|---|
| Availability | 91.9 | 98.0 | % |
| Utilisation | 44.7 | 35.0 | % |
| All Downtime | 47.1 | 12.2 | mins/day |
| Bogging Downtime | 9.0 | 0.0 | mins/day |

TABLE 2

| | Crusher 1 | Crusher 10 | Units |
|---|---|---|---|
| Availability | 91.9 | 97.3 | % |
| Utilisation | 44.7 | 36.0 | % |
| All Downtime | 47.1 | 10.2 | mins/day |
| Bogging Downtime | 9.0 | 0.0 | mins/day |

As to reasons for the improved performance in terms of availability, reduced downtime and more efficient utilisation including lower power consumption for given maximum crushing pressure, finite element analysis conducted for both types of crusher showed less stress penetration into the mid-section of the crusher 10 during crushing, including the mid-section of head liner 102*a* and bowl mid-section wall 104*c* due to the greater thickness and bending strength of the mid-section 104*c*. Tensile stress of the crown 102*aa* of head liner 102*a* was, at 300 MPa, lower than for the crown 2*aa* of crusher 1 with the consequence of longer service life to failure. By way of example, tensile stress was reduced at various ore sizes as follows:

45% reduction in head liner 102*a* tensile stress for 25 mm ore size;

67% reduction in head liner 102*a* tensile stress for 55 mm ore size; and

53% reduction in head liner 102*a* tensile stress for 70 mm ore size compared to the 55 mm ore size.

At the same time, the geometry of the head liner or mantle 102*a* with its parallel vertically extending sides in cylindrical portion 102*e*— together with the extension of the crown 102*aa* a short distance into the feed chute 106 with the consequence that the head liner 102*a* is confined within the bowl cavity 104*a* and the feed chute 106—essentially avoids lump ejection and the inefficient crushing that results from that.

Benefits of the crusher 10, as above described include:

<80 mm feed acceptance;

Increased head liner thickness and strength;

Reduced fatigue;

Improved service life expectancy; and

Installation compatibility with dimensionally identical installation parameters (packaging) to the prior art crusher 1 with the exception of a small (for example 25 mm height increase).

Modifications and variations to the crushing apparatus as described here may be apparent to the skilled reader of this disclosure. Such modifications and variations are deemed within the scope of the present invention.

The invention claimed is:

1. A crushing apparatus for frangible or friable material comprising:

a bowl of unitary construction having a chamber for receiving said material and a discharge opening disposed at the base thereof, said discharge opening defining a throat having a circumferential wall and the bowl having a central axis;

a crushing head disposed within said discharge opening and including an integrally formed head liner of wear resistant material provided with two parallel side walls transitioning to a crown portion and having a crushing face in spaced relation to said circumferential wall of said throat defining a nip between said wall and the crushing face of said crushing head, said crushing head having a gyratory axis extending at an angle to the central axis; and a drive assembly including a transmission and a rotatable eccentric shaft for driving said crushing head within said bowl and about said gyratory axis in a nutating motion wherein said bowl comprises a feed section and a discharge section, each defined by a wall and spaced by a mid-section, wherein thickness of a wall defining at least the mid-section is greater than a thickness of the wall of the discharge section.

2. The crushing apparatus of claim 1, wherein a wall of the feed section of the bowl has approximately the same thickness as said wall of the discharge section.

3. The crushing apparatus of claim 2, wherein an outer surface of each of the respective feed wall and discharge wall are both circular and concentric.

4. The crushing apparatus of claim 1, wherein said bowl comprises two intersecting frusto-conical portions, defined by the mid-section wall, the first frusto-conical portion forming an upper portion of the bowl and tapering in a downward direction; and the second frusto-conical portion forming a lower portion of the bowl tapers in a downward direction.

5. The crushing apparatus of claim 4, wherein the first frusto-conical portion tapers in a downward direction at an angle of between 30 and 35 degrees from the central axis.

6. The crushing apparatus of claim 4, wherein a thickest section of the circumferential wall of the bowl aligns with a plane at which the first and second frusto-conical portions intersect.

7. The crushing apparatus of claim 4, wherein a wall of a lower portion of the feed section and mid-section comprises solid material with a wedge shaped or triangular section.

8. The crushing apparatus of claim 1, wherein said parallel side walls are formed integral with a lower frusto-conically shaped crushing face portion.

9. The crushing apparatus of claim 8, wherein a wall of said crown portion has greater thickness than said parallel side walls and said lower frusto-conically shaped crushing face portion.

10. The crushing apparatus of claim 9, wherein said wall of said crown portion has greatest thickness where transitioning to said parallel side walls of said head liner.

11. The crushing apparatus of claim 9, wherein wall thickness tapers downward along said parallel side walls and crushing face of the head liner, said parallel side walls having reduced stress profile compared to said crown portion.

12. The crushing apparatus of claim 1, including an adjusting means for adjusting height of said bowl above a base of said crushing apparatus, part of said adjusting means being located in said mid-section wall.

13. The crushing apparatus of claim 8, including a separate feed chute disposed above, and connected to, the bowl.

14. The crushing apparatus of claim 13, wherein said crown portion extends a short distance into the feed chute.

15. The crushing apparatus of claim 4, wherein said bowl is a replaceable component.

16. The crushing apparatus of claim 13, wherein said teed chute is a replaceable component.

17. A method of maintaining a crushing apparatus for frangible or friable material, said crushing apparatus comprising:

a bowl of unitary construction requiring maintenance having a chamber for receiving said material and a discharge opening disposed at the base thereof, said discharge opening defining a throat having a circumferential wall and the bowl having a central axis;

a crushing head disposed within said discharge opening and including an integrally formed head liner of wear resistant material provided with two parallel side walls transitioning to a crown portion and having a crushing face in spaced relation to said circumferential wall of said throat defining a nip between said wall and the crushing face of said crushing head, said crushing head having a gyratory axis extending at an angle to the central axis; and a drive assembly including a transmission and a rotatable eccentric shaft for driving said crushing head within said bowl and about said gyratory axis in a nutating motion wherein said bowl comprises a feed section and a discharge section, each defined by a wall and spaced by a mid-section, wherein thickness of a wall defining at least the mid-section is greater than a thickness of the wall of the discharge section; and wherein at least one of said bowl and said feed chute is replaced during a maintenance procedure.

18. The method of claim 17, wherein said crushing apparatus further comprises a feed chute.

* * * * *